Figure 1:
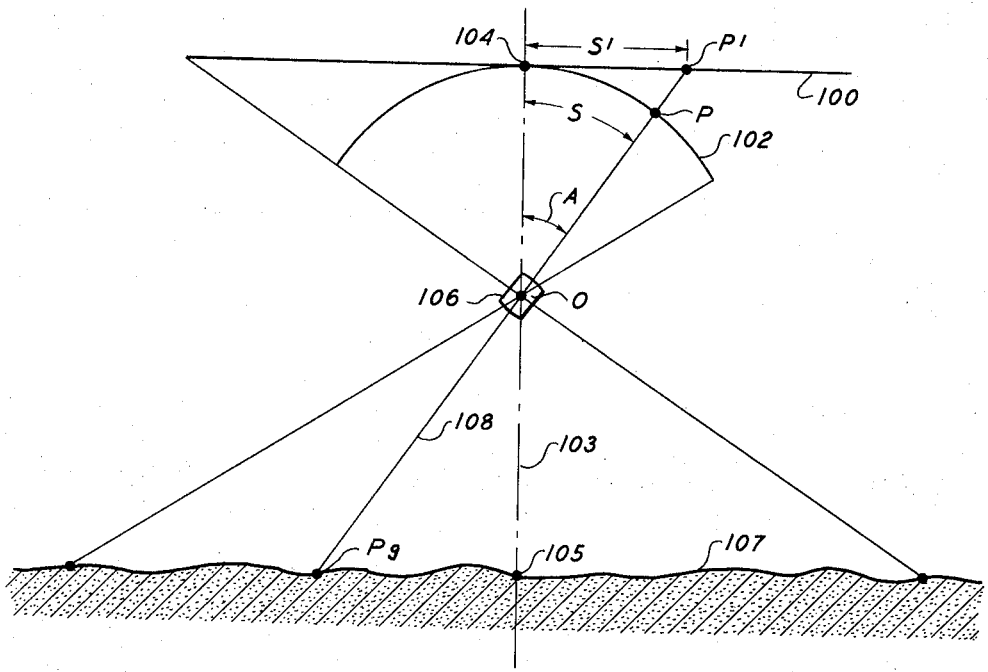

Jan. 9, 1968     C. M. ASCHENBRENNER     3,362,287
PRINTER FOR RECTIFYING PANORAMIC DISTORTION
Filed July 6, 1965     3 Sheets-Sheet 1

INVENTOR
CLAUS M. ASCHENBRENNER
BY Stanley Bilsky
Robert L. Nathans
ATTORNEYS

Jan. 9, 1968     C. M. ASCHENBRENNER     3,362,287

PRINTER FOR RECTIFYING PANORAMIC DISTORTION

Filed July 6, 1965     3 Sheets-Sheet 3

INVENTOR.
CLAUS M. ASCHENBRENNER
BY
ATTORNEYS

United States Patent Office 3,362,287
Patented Jan. 9, 1968

3,362,287
PRINTER FOR RECTIFYING PANORAMIC DISTORTION
Claus M. Aschenbrenner, Lexington, Mass., assignor to Itek Corporation, Lexington, Mass., a corporation of Delaware
Filed July 6, 1965, Ser. No. 469,709
14 Claims. (Cl. 88—24)

This invention relates to improved printers, and particularly to printers for rectifying panoramic distortion.

A panoramic aerial camera is a scanning type of camera which combines the features of large, angular coverage and high image quality. The terrain is scanned through large scan angles across the direction of flight. In particular, panoramic aerial cameras are advantageous in the resolution of small ground details from high altitudes.

The basic configurations of panoramic aerial cameras employ a very narrow exposure slit of the order of one to two mils. The camera optical system projects the image of the scene through the slit. The slit and camera lens systems are rotated about an axis coincident with the rear nodal point of the camera lens system across the direction of flight. The exposure slit scans the film disposed along an arc, whose radius is equal to the focal length of the camera lens system.

The obvious advantages of the wide continuous coverage obtained with panoramic photography have often been outweighted by the difficulties involved in obtaining accurate or detailed information from the photographs. The major difficulty results from distortions that vary measurements taken along orthogonal axes of the image. An unrectified panoramic aerial photograph, therefore, does not present an image in map scale. For many applications, the ability to provide rectified prints is a prerequisite to the use of panoramic aerial photography.

The analysis of aerial panoramic distortion distinguishes three types of distortions. The first, in which the panoramic aerial camera is considered stationary, is panoramic distortion where the displacement of images from their true orthographic position is due to the curvature of the focal surface and the sweeping action of the lens. The second and third distortions are residual distortions, due to the fact that the panoramic aerial camera has forward velocity. The second distortion is sweep or scan positional distortion, which is the displacement of images from their true geometric positions due to the forward displacement of the vehicle during the scan period of the lens. This distortion is in addition to, and modifies the movements of, points due to panoramic distortion. The third distortion is image motion compensation distortion, which is the displacement of images from their true geometric position due to the lens or film motion which is used to compensate for image motion during the exposure cycle. This distortion is in addition to, and modifies the movement of, points due to both panoramic and scan positional distortion.

Several methods have been devised for solving the distortions introduced in the taking mode. Recent advances in panoramic transforming printers have been designed on the basis of geometrical duplication of the taking conditions, in order to transform the panoramic scenes to equivalent flat photographs. The light slit sweeps across the negative platen and projects the image through a lens to the printing material mounted on an easel. Coincident with this operation, the easel and platen translate relative to each other, to correct for relative ground displacement and image motion compensation during the camera sweep.

One other method of solving the transformations by optomechanical means, is the concept of the continuous enlarging printer with a variable printing ratio. In this instrument, the negative is driven past a slit while the printing material is driven at an appropriate rate past another slit or over a printing stage. The lens and easel stages must be moved along the direction of projection at a programmed rate, to accomplish the scale changes required. To compensate for the different rate of change of the orthogonal scales, the three projection elements must be tilted during the scan of the negative. While these motions are compensating for the panoramic distortion, the platen, slit and easel must be translated normal to the direction of the film drive to compensate for the sweep positional and image motion compensation distortions. It is obvious that such a number of interrelated nonlinear motions are extremely difficult to accurately generate. In the case of film having a resolution of one hundred lines per millimeter, the total accumulated error would have to be kept to less than 0.01 millimeter.

A further problem in recreating the taking conditions is the geometry, that is: (1) the original negative is disposed on a cylindrical platen conforming to the curved shape of the aerial camera platen; (2) the printing material is disposed on a flat easel conforming to the ground plane; and (3) the projection line is rotated about the center of projection. It is apparent that merely recreating the taking mode does not project a sharp image of the cylindrical film surface onto the flat projection plane all at once. A theoretical solution to this problem is to design and manufacture an asymmetric lens system or a suitable approximation thereto. However, asymmetric lens systems are expensive because they are difficult to design and build.

Furthermore, in the taking mode the camera is focused at infinity. The transforming printer, however, has to deal with finite image and object distances. This fact imposes three conditions upon the optical system of the transforming printer. The first condition, requires that the optical system maintain the proper ratio of longitudinal and transverse scale. The second condition, requires that a point on the film strip must remain focused at the corresponding point on the rectified print. The third condition, requires that the image quality is not impaired when a slit of finite width is used for keeping the exposure time within reasonable limits. The latter condition is recognized by those skilled in the art of photogrammetry as the Scheimflug condition, that states that the object, lens and image planes must intersect in a common line for sharp focus over an extended field.

Essentially, this invention fulfills these conditions by the projection of the image along a projection axis, such that the momentary direction of the projection axis is generally angularly separated from the momentary position of the optical axis of the printer projection lens. To compensate for image motion due to optical axis rotation and to maintain exact scale relationship at sharp focus, the projection lens is vertically shifted along the optical axis. To maintain the magnification rate of the transforming printer, the platen and easel have new shapes.

It is, therefore, an object of this invention to provide an improved printer for rectifying panoramic distortion.

Another object of this invention is to provide an improved printer that provides rectified prints in map scale.

A further object of this invention is to provide an improved printer that substantially reduces accumulated error due to nonlinear motions of the projection elements.

A further object of this invention is to provide an improved printer that projects a sharp image along the projection plane.

A further object of this invention is to provide an improved printer that maintains high image quality along the projection plane.

A further object of this invention is to provide an improved printer that maintains the image at sharp focus over an extended field.

These, and other advantages are obtained in the present invention by providing a printer for rectifying panoramic distortion, comprising in combination a film strip bearing images along its length of objects at nadir and extending to the horizon. The images are increasingly and continuously compressed in size, along the length of the film relative to the actual dimensions of objects represented thereby. The compression is in accordance with a component of panoramic distortion. There is a support means for supporting the film strip such that an edge of the film strip describes an arc. A printing means is provided for photographically printing the images borne by the film strip. Finally, there is provided a projection means for optically scanning the film strip. The projection means sequentially projects the images at the printing means, along a projection axis along the length of the printing means. The printing means is oriented with respect to the film strip in order to cause a continuously increasing lateral magnification of the images in the direction of the length of the printing means as the images further and further off nadir are sequentially projected upon the printing means by the projection means. The component of panoramic distortion is thereby eliminated. The projection means includes a lens system, means for positioning the lens system along the projection axis and means for rotating at least a portion of the lens system during the scanning of the images by the projection means. The positioning of the lens system along the projection axis causes the images to be focused upon the printing means. The rotation of a portion of the lens system causes the optical axis of the lens to be substantially coincident with the projection axis when images of nadir objects are being projected at the printing means. The rotation causes the projection axis to be increasingly angularly displaced from the optical axis as the scanning of the film strip by the projection means proceeds to continuously maintain images of off nadir objects in focus at the printing means.

In one embodiment of the invention, the printing means comprises photographic printing material together with an easel upon which the photographic printing material is mounted. The film strip is a transparent photograph; the projection means further comprises means for directing a beam of light through the photograph; the directing means takes the form of an opaque member having a slit formed therein and means for illuminating the slot to produce the beam of light; the support means comprises a curved platen; and the printing means comprises a curved easel. There is further included, means for moving the lens toward or away from the film strip as images representing objects increasingly further from nadir are projected by the projection means, to thereby account for the separation of the nodal points of the lens.

For a better understanding of the present invention together with other and further examples thereof, reference is made to the following description taken in connection with the accompanying drawings, the scope of which will be pointed out in the appended claims.

Figure 2:
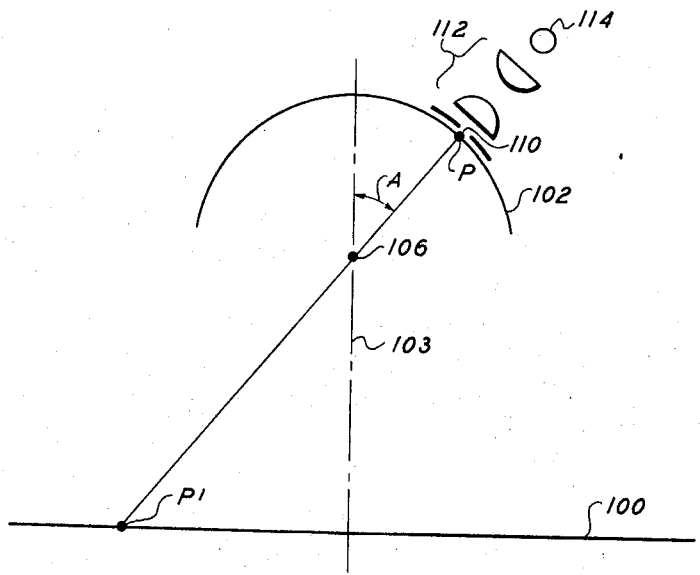
Figure 3:
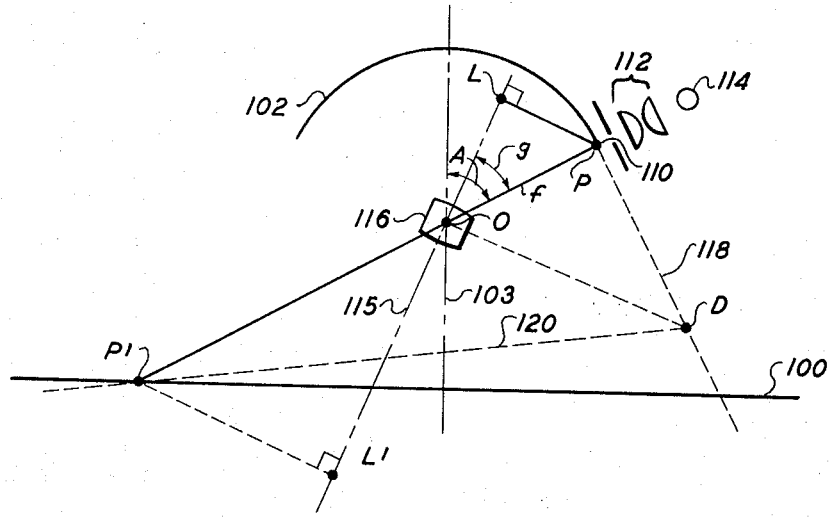
Figure 4:
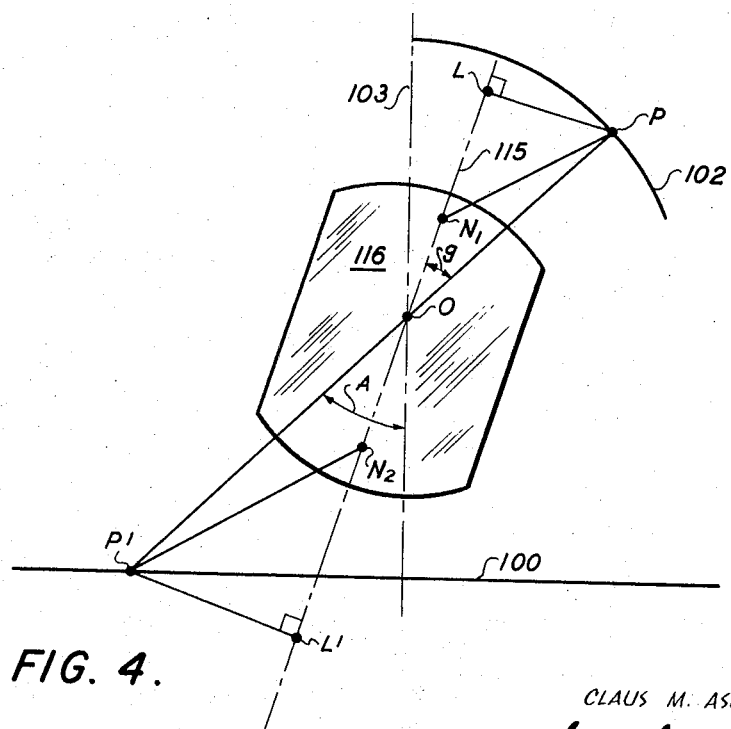
Figure 5:
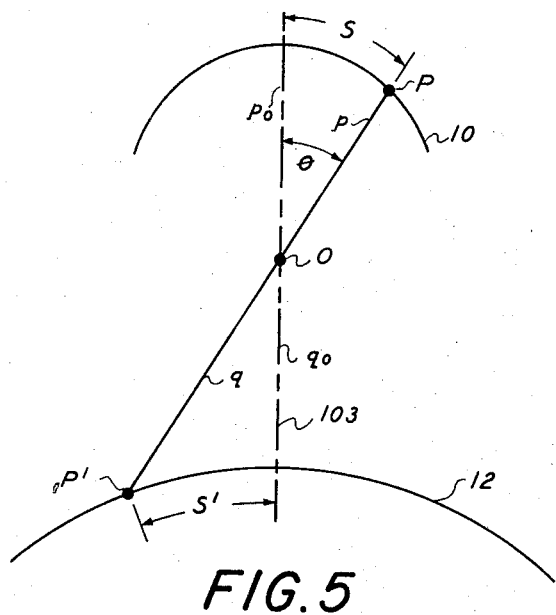
Figure 6:
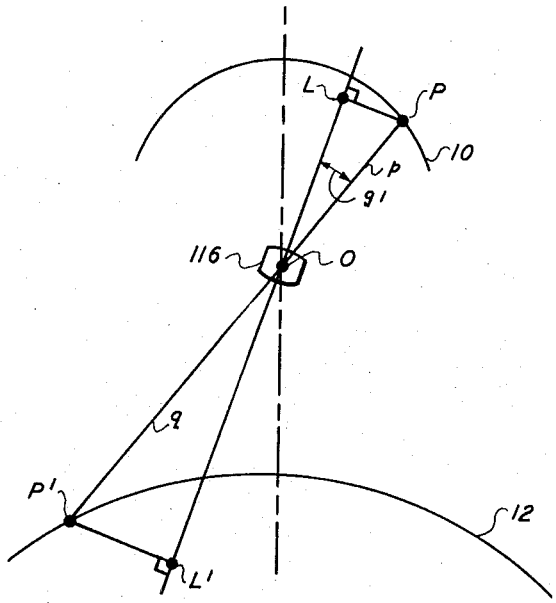

In the drawings, FIGURE 1 presents basic geometrical relationships between the original and rectified prints;

FIGURE 2 discloses certain basic optical conditions;

FIGURE 3 schematically illustrates the principle of the optical solution defined by the present invention;

FIGURE 4 describes the relationship between the nodal points of the projection lens;

FIGURE 5 discloses the derivation and the new shapes of the platen and easel; and FIGURE 6 shows the configuration in the new printing mode.

There is presented in FIGURE 1 basic geometrical relationships between the original and rectified prints. As previously noted, the purpose of the rectifying printer is to transform an original but distorted panoramic image into a plane projection resembling a vertical photograph of the ground. The plane of the rectified print 100 is tangent to the arc of the curved film 102 at point 104. The nadir of point 104 is point 105 along nadir axis 103 on the ground plane 107. The center of rotation 106 of the panoramic aerial camera is at the center of the radius of curvature, O, of the film arc at an assumed altitude, H, above ground plane 107, measured between points 105 and 106. The radius, $f$, is the focal length of the panoramic aerial camera measured between the points 106 and 104. The image of a point, $Pg$, on the ground, is imaged at a point, P, on the original negative panoramic film strip and at a point, P′, on rectified print 100 along the momentary optical axis 108 of the panoramic aerial camera. It will be apparent that $S=fA$ and $S'=f \tan A$, where S is the curvilinear length along the cylindrical original negative film strip; A is the sweep or scan angle as measured at 106 between the momentary optical axis 108 of the panoramic aerial camera and nadir axis 103; and S′ is the image of S along rectified print 100. The statement, $W'/W=P'O/PO''=\sec A$, relates to the width, W′, of the rectified print at P′ and the constant width, W, of the film strip.

In FIGURE 2, there is presented the basic optical conditions with the respective positions of original panoramic film strip 102 and the projection plane of rectified print 100 when the original geometry is used. From FIGURE 2, it is apparent that there are only two planes of symmetry. Thus, a lens with rotational symmetry placed at the center of projection 106 would not be capable of throwing a sharp picture of the cylindrical film surface of the original 102 onto the flat projection plane of the rectified print 100 all at once. As has been stated, the rectifying projection printer of the present invention is based upon recreating the taking mode. The rectifying projection printer scans the original panoramic film strip with a slit 110, condenser lens system 112 and a light source 114.

As noted, in the taking mode the focus of the camera is set at infinity. The rectifying projection printer, however, has to deal with finite image and object distances. This fact imposed three conditions upon the optical system of the rectifying projection printer.

The first condition, requires that the optical system maintain the proper ratio of longitudinal and transverse scale in accordance with $S'=f \tan A$ and $$W'/W=P'O/PO=\sec A$$

The second condition, requires that any point, P, on the film strip be focused at the corresponding point, P′, on the rectifying print.

The third condition, requires that the neighborhood of point P on the film be in focus on the corresponding part of the plane of the rectified print, surrounding point P′. As stated, this condition is recognized as the Scheimpflug condition. It is to be fulfilled to the extent that within the area transmittted by a slit of finite width the image quality is not impaired.

These three conditions are met by this invention in the following ways.

The first condition is met by proper arrangement and disposition of film, lens and rectifier easel with respect to each other.

The second condition is met by tilting the projection lens of the rectifying projection printer such that the momentary direction of projection is along an axis angularly disposed from the optical axis of the rectifying projection printer lens.

The principle of the optical solution is shown in FIGURE 3. A projection lens 116 at, O, has a fixed focal length and the optical axis 115 of projection lens 116 subtends an offset angle, $g$, with the momentary direction of projection, POP′. It will be seen from FIGURE 3, that $OL=OP \cos g=f \cos g$, where $f$ is the focal length of the panoramic aerial camera. The focal length of the projection lens is $F=(OL)(OL')/(OL+OL')$, which is lens equation applied along the optical axis; therefore, $F=(f \cos g)/(1+\cos A)$, where A is the sweep or scan angle as defined previously. For reasons of symmetry, projection lens 116 is to be used along the axis of symmetry of the whole system; therefore $f=2F$ and $$\cos g = \tfrac{1}{2}(1+\cos A)$$

The angle $g$ becomes an expression for the offset angle in the ideal situation. A more general form for $g$ is $$\cos g = F/f + (1-F/f)\cos A$$

for accommodating variations in focal length of individual projection lenses. It will be noted that the general form fulfills the condition that at nadir $\cos g = 1$ and $g=0$.

The second condition, then, is fulfilled with the design of a mechanical system to control the direction of optical axis 115 in such a way as to satisfy the expression for $g$.

The third condition, known as the Scheimpflug condition, is also substantially fulfilled, since the intersection, D, of the tangential plane 118 through P and the projection lens plane 120, falls close to projection plane 100, where the rigorous condition would require the intersection to be located.

The projection thus far has been described only in terms of the geometrical center of projection, O, and the projecting ray, POP′. When an actual lens is used, the distance between the nodal points has to be taken into account. FIGURE 4 shows the situation schematically, where $N_1$ and $N_2$ are the two nodal points and $PN_1$ and $N_2P'$ are parallel by definition of nodal points. It is obvious that O is also the geometrical center which is on optical axis 115 to divide the nodal distance in such a way that $N_1O/ON_2=PO/OP'=\cos A$, where A is the sweep or scan angle as previously defined.

From this equation, the distances $N_1O$ and $ON_2$ of the nodal points $N_1$ and $N_2$ from the geometrical center, O, are found to be $N_1O=N_1N_2 \cos A/(1+\cos A)$ and $$ON_2 = N_1N_2/(1+\cos A)$$

Since the nodal points have a fixed position on the lens axis, it is obvious that in order to satisfy these equations for any momentary value of the scan angle, A, the whole lens 116 has to be shifted along it momentary axis 115, while it turns about the geometrical center, O. The necessary shift of the lens is provided by a mechanical system which connects the position of the lens with respect to the center, O, to the momentary value of the scan angle, A, in the required manner.

The value for the focal length, F, of the projection lens and the momentary value of the angle $g$ corresponding to any momentary value of the scan angle, A, are found again, as in the previously treated ideal case, by applying the general lens equation along the optical axis, LL′. The rather involved mathematical expressions have no relevance to the description of the invention and shall therefore be omitted here; likewise, the more general forms to accommodate variations in focal length of individual projection lenses shall be omitted.

In some cases it might be necessary or desirable to reduce the angular offset, $g$, of the lens axis resulting from the geometrical conditions as described so far, in order to utilize lenses having a smaller angular field, but otherwise desirable properties. In order to accomplish this reduction in angular offset, this invention provides a new, alternative printing mode, which is not based upon recreating the taking mode as has been the case in the old printing mode hitherto described.

Instead, in the new printing mode, the distance between the projection lens and the film center is made greater than the original focal length, $f$, of the taking camera, and the film platen and printing easel are given new shapes in order to maintain the same relationship between film and print as in the old printing mode.

The equations for these new shapes are derived from FIGURE 5.

FIGURE 5 shows the disposition of film platen 10, projection center, O, and printing easel 12, in the new printing mode. A point, P, on the film is projected onto the easel at P′. The line of projection, POP′, includes the new sweep angle, $\phi$, with the axis of symmetry 103. The distances OP and OP′ are designated $p$ and $q$ respectively. The new distance of the film center from the projection center O, is designated $p_0$, the new distance of the easel center from the projection center O, is $q_0$.

The so far unknown shapes of platen and easel, expressed in polar coordinates $\phi$ and $p$, and $\phi$ and $q$ respectively, are found from the two general differential equations for elements of arc length $dS$ and $dS'$ respectively, namely $$(dS)^2 = dp^2 + p^2 d\phi^2$$

and $$(dS')^2 = dq^2 + q^2 d\phi^2$$

In order to solve these equations, use is made of the previously stated condition that the relationship between film and print in the new mode must be the same as in the old mode. Therefore, as shown in FIGURE 1 and the pertinent description, in the new mode, the arc lengths are $S=fA$, $S'=f \tan A$, and the ratio $p/q=\sec A$. Combining these three conditions with the two differential equations in a manner well within the skill of the art, it is found that $$p = p_0[1 - 2(p_0^2 - f^2)\sin^2(A/2)/p_0^2]^{1/2}$$
$$q = p \sec A$$
$$d\phi = [cf^2 dA^2 - dp^2)/p^2]^{1/2}$$

from which the sweep angle, $\phi$, is found by numerical integration.

In the new printing mode, the condition that any point, P, on the film strip be focused at the corresponding point, P′, on the rectified print, is met by this invention, as in the old printing mode, by tilting the projection lens such that its mometnary optical axis is angularly disposed from the momentary direction of projection.

The equation for finding the proper amount of this angular offset is derived from FIGURE 6.

FIGURE 6 shows configuration of film, 10, lens, 116, and printing easel, 12, in the new printing mode, in analogy to FIGURE 3, which showed the configuration in the old printing mode.

Again, applying the lens equation along the optical axis, LL′, it is found that the focal length of the projection lens is $F=(LO)(OL')/(LO+OL')$. It will be seen from FIGURE 6 that $LO=p \cos g'$ and $OL'=q \cos g'$, where $g'$ is the momentary angular offset of the lens axis, LL′, from the momentary direction of projection, PP′, in the new printing mode. By combining these equations and the previously found relation $q=p \sec A$ with the above lens equation, it is found that $F=p \cos g'/(1+\cos A)$.

The focal length, F, of the projection lens, is again found from the case of projection along the axis of symmetry, 103, where $\cos A = \cos g' = 1$ and $p=p_0$; hence $F=p_0/2$. Therefore, the equation for the angular offset, $g'$, in the new printing mode becomes $$\cos g' = \tfrac{1}{2}(1+\cos A)p_0/p$$

from which it follows that the angular offset, $g'$, in the new printing mode is actually smaller than the angular offset, $g$, in the old printing mode, as was the purpose of introducing the new printing mode.

More general forms of the equations expressing the configuration of the new printing mode may be introduced in the same manner and for the same purposes as in the old printing mode. They are omitted here for the same reasons stated in the description of the old printing mode.

While there has been described what is presently considered the preferred embodiments of the present invention, it will be obvious to those skilled in the art that various changes and modifications may be made therein without departing from the inventive concepts, and it is aimed in the appended claims to cover all such changes and modifications as being far within the true spirit and scope of the invention.

What is claimed is:

1. A printer for rectifying panoramic distortion, comprising in combination:

a film strip bearing images along its length of objects at nadir and extending to the horizon, said images being increasingly and continuously compressed in size along the length of said film strip relative to the actual dimensions of objects represented thereby in accordance with a component of panoramic distortion;

support means for supporting said film strip so that an edge of said film strip describes an arc;

printing means for photographically printing said images borne by said film strip; and projection means for optically scanning said film strip to sequentially project said images at said printing means along a projection axis along the length of said printing means, said printing means being oriented with respect to said film strip to cause continuously increasing lateral magnification of said images in the direction of said length of said printing means as said images further and further off nadir are sequentially projected upon said printing means by said projecting means, thereby to eliminate said component of panoramic distortion, said projection means including a lens system, means for positioning said lens system along said projection axis to cause said images to be focused upon said printing means, and means for rotating at least a portion of said lens system during the scanning of said images by said projection means to cause the optical axis of said lens to be substantially coincident with said projection axis when images of nadir objects are being projected at said printing means and causing said projection axis to be increasingly angularly displaced from said optical axis as the scanning of said film strip by said projection means proceeds to continuously maintain images of off nadir objects in focus at said printing means.

2. The combination as set forth in claim 1 wherein said printing means comprises photographic printing material together with an easel upon which said photographic printing material is mounted.

3. The combination as set forth in claim 1 wherein said film strip is a transparent photograph and said projection means further comprises means for directing a beam of light through said photograph.

4. The combination as set forth in claim 3 wherein said means for directing takes the form of an opaque member having a slit formed therein and means for illuminating said slit, thereby to produce said beam of light.

5. The combination as set forth in claim 1 wherein said support means comprises a curved platen and said printing means comprises a curved easel.

6. The combination as set forth in claim 1 further including means for moving said lens toward or away from said film strip as images representing objects increasingly further from nadir are projected by said projection means to thereby take account of the separation of the nodal points of said lens.

7. The combination as set forth in claim 6 wherein said printing means comprises photographic printing material together with an easel upon which said photographic printing material is mounted.

8. The combination as set forth in claim 6 wherein said film strip is a photographic negative and said projection means further comprises means for directing a beam of light through said photographic negative.

9. The combination as set forth in claim 8 wherein said means for directing takes the form of an opaque member having a slit formed therein and means for illuminating said slit, thereby to produce said beam of light.

10. The combination as set forth in claim 6 wherein said printing means comprises photographic printing material together with a curved easel upon which said photographic printing material is mounted and said support means comprises a curved platen.

11. A printer for rectifying panoramic distortion, comprising in combination:

a transparent photograph bearing images along its length of objects at nadir and extending to the horizon, said images being increasingly and continuously compressed in size along the length of said photograph relative to the actual dimensions of objects represented thereby in accordance with a component of panoramic distortion;

support means for supporting said film photograph so that an edge of said photograph describes an arc;

printing means for photographically printing said images borne by said photograph, said printing means including photographic printing material together with an easel upon which said photographic printing material is mounted;

projection means for optically scanning said photograph to sequentially project said images at said printing means along a projection axis along the length of said photographic printing material, said photographic printing material being oriented with respect to said film strip to cause continuously increasing magnification of said images in the direction of said length of said photographic printing material as said images further and further off nadir are sequentially projected upon said photographic printing material by said projection means, to thereby eliminate said component of panoramic distortion, said projection means including a lens system, means for positioning said lens system along said projection axis to cause said images to be focused upon said photographic printing material, means for rotating at least a portion of said lens system during the scanning of said images by said projection means to cause the optical axis of said lens to be substantially coincident with said projection axis when images of nadir objects are being projected at said photographic printing material and causing said projection axis to be increasingly displaced from said optical axis as the scanning of said photograph by said projection means proceeds to continuously maintain images of off nadir objects in focus at said photographic printing paper, and means for directing a beam of light through said photograph along said projection axis; and means for moving said lens towards or away from said photograph as images representing objects increasingly further from nadir are scanned by said projection means to thereby take account of the separation of the nodal points of said lens.

12. The combination as set forth in claim 11 wherein said means for directing takes the form of an opaque member having a slit formed therein and means for illuminating said slit, thereby to produce said beam of light.

13. The combination as set forth in claim 12 wherein said support means comprises a curved platen and said printing means comprises a curved easel.

14. A printer for rectifying panoramic distortion comprising, in combination:

a transparent photograph bearing images along its length of objects at nadir and extending to the horizon, said images being increasingly and continuously compressed in size along the length of said photograph relative to the actual dimensions of objects represented thereby in acordance with a component of panoramic distortion;

support means for supporting said photograph, said support means including a curved platen so that an edge of said photograph describes an arc;

printing means for photographically printing said images borne by said photograph, said printing means including photographic printing material together with a curved easel upon which said photographic printing material is mounted;

projection means for optically scanning said photograph to sequentially project said images at said photographic printing material along a projection axis along the length of said photographic printing, said printing means being oriented with respect to said photograph, to cause continuously increasing magnification of said images in the direction of said length of said photographic printing material as said images further and further off nadir are sequentially projected upon said photographic printing material by said projection means, thereby to eliminate said component of panoramic distortion, said projection means including a lens system, means for positioning said lens system along said projection axis to cause said images to be focused upon said photographic printing material, means for rotating at least a portion of said lens system during the scanning of said images by said projection means to cause the optical axis of said lens to be substantially coincident with said projection axis when images of nadir objects are being projected at said photographic printing material and causing said projection axis to be increasingly displaced from said optical axis as the scanning of said photograph by said projection means proceeds to continuously maintain images of off nadir objects in focus at said photographic printing material, and means for directing a beam of light through said photograph along said projection axis; and means for moving said lens along said optical axis as images representing objects increasingly further from nadir are scanned by said projection means to thereby take account of the separation of the nodal points of said lens.

References Cited
UNITED STATES PATENTS

| | | | |
|---|---|---|---|
| 2,607,268 | 8/1952 | Bartz | 88—24 |
| 2,771,815 | 11/1956 | Nistri | 88—24 |

NORTON ANSHER, *Primary Examiner.*

R. A. WINTERCORN, *Assistant Examiner.*